United States Patent
Iguchi et al.

(10) Patent No.: US 12,027,317 B2
(45) Date of Patent: Jul. 2, 2024

(54) DIELECTRIC COMPOSITION AND MULTILAYER CERAMIC ELECTRONIC DEVICE

(71) Applicant: TDK CORPORATION, Tokyo (JP)

(72) Inventors: Toshihiro Iguchi, Tokyo (JP); Hiroaki Murakami, Tokyo (JP); Yuichiro Sueda, Tokyo (JP); Ryota Namiki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 177 days.

(21) Appl. No.: 17/748,580

(22) Filed: May 19, 2022

(65) Prior Publication Data

US 2022/0392704 A1    Dec. 8, 2022

(30) Foreign Application Priority Data

May 26, 2021   (JP) ................. 2021-088548

(51) Int. Cl.
| | |
|---|---|
| H01G 4/12 | (2006.01) |
| C04B 35/468 | (2006.01) |
| H01G 4/008 | (2006.01) |
| H01G 4/012 | (2006.01) |
| H01G 4/30 | (2006.01) |

(52) U.S. Cl.
CPC ....... *H01G 4/1227* (2013.01); *C04B 35/4682* (2013.01); *H01G 4/008* (2013.01); *H01G 4/012* (2013.01); *H01G 4/30* (2013.01); *C04B 2235/3206* (2013.01)

(58) Field of Classification Search
CPC ...... H01G 4/1227; H01G 4/008; H01G 4/012; H01G 4/30; C04B 35/4682; C04B 2235/3206

See application file for complete search history.

(56) References Cited

U.S. PATENT DOCUMENTS

| | | | |
|---|---|---|---|
| 2004/0145856 A1* | 7/2004 | Nakamura | H01G 4/30 361/311 |
| 2010/0014210 A1* | 1/2010 | Nakamura | H01G 4/1227 252/62.3 BT |
| 2010/0195260 A1 | 8/2010 | Ishihara | |
| 2011/0274614 A1* | 11/2011 | Lamminmaki | C01G 23/005 423/598 |
| 2017/0186536 A1* | 6/2017 | Sato | C04B 35/6342 |
| 2017/0365412 A1* | 12/2017 | Taniguchi | H01G 4/30 |
| 2021/0202171 A1* | 7/2021 | Tsutsui | H01G 4/012 |
| 2021/0202177 A1* | 7/2021 | Kurosu | H01G 4/248 |
| 2021/0202178 A1* | 7/2021 | Kurosu | H01G 4/008 |
| 2021/0202179 A1* | 7/2021 | Saito | H01G 4/1218 |
| 2021/0202180 A1* | 7/2021 | Fukunaga | H01G 4/1209 |
| 2021/0202181 A1* | 7/2021 | Wakashima | H01G 4/30 |

FOREIGN PATENT DOCUMENTS

JP    2013-012418 A    1/2013

* cited by examiner

*Primary Examiner* — Michael P McFadden
(74) *Attorney, Agent, or Firm* — Oliff PLC (57) ABSTRACT

A dielectric composition includes dielectric particles and first segregations. The dielectric particles each include a perovskite compound represented by $ABO_3$ as a main component. The first segregations each include Ba, Ti, Si, Ni, and O.

5 Claims, 2 Drawing Sheets

DIELECTRIC COMPOSITION AND MULTILAYER CERAMIC ELECTRONIC DEVICE

BACKGROUND OF THE INVENTION

The present invention relates to a dielectric composition and a multilayer ceramic electronic device including the dielectric composition.

As shown in Patent Document 1, a multilayer ceramic electronic device formed by alternately laminating ceramic layers composed of a dielectric composition and internal electrode layers is known. The multilayer ceramic electronic device has differences in characteristics, such as shrinkage factor and linear expansion coefficient, between the ceramic layers and the internal electrode layers. Structural defects, such as cracks and delamination, occur due to the differences in characteristics, and the durability in a high-temperature and high-humidity environment may decrease.

Patent Document 1: JP2013012418 (A)

BRIEF SUMMARY OF THE INVENTION

The present invention has been achieved under such circumstances. It is an object of the present invention to provide a dielectric composition and a multilayer ceramic electronic device having an excellent durability for a high-temperature and high-humidity environment.

To achieve the above object, a dielectric composition according to the present invention comprises:

dielectric particles each including a perovskite compound represented by $ABO_3$ as a main component; and first segregations each including Ba, Ti, Si, Ni, and O.

The dielectric composition according to the present invention having the above-mentioned features is applicable to multilayer ceramic electronic devices. As a result of diligent studies, the inventors of the present invention have found that a multilayer ceramic electronic device including the above-mentioned dielectric composition exhibits an excellent durability even in a high-temperature and high-humidity environment.

Preferably, a molar ratio (Ni/Si) of Ni to Si in the first segregations is 0.1 or more.

Preferably, an average particle size of the first segregations is 0.05 μm or more and 0.30 μm or less.

Preferably, the dielectric composition further comprises a second segregation containing Mg.

Preferably, the perovskite compound comprises barium titanate.

To achieve the above object, a multilayer ceramic electronic device according to the present invention comprises an element body formed by alternately laminating a ceramic layer including a perovskite compound represented by $ABO_3$ as a main component and an internal electrode layer containing Ni, wherein first segregations each including Ba, Ti, Si, Ni, and O are present in a boundary between the ceramic layer and the internal electrode layer.

As a result of diligent studies, the inventors of the present invention have found that the multilayer ceramic electronic device having the above-mentioned features improves the durability for a high-temperature and high-humidity environment. The reason why the durability is improved is not necessarily clear, but it is considered that the improvement in durability is due to the improvement in joint strength between the ceramic layer and the internal electrode layer by the first segregations containing predetermined elements.

Preferably, the number of first segregations contained in a unit length of the boundary is 0.2 pieces/μm or more and 3.2 pieces/μm or less.

In the multilayer ceramic electronic device, preferably, a molar ratio (Ni/Si) of Ni to Si in the first segregations is 0.1 or more.

In the multilayer ceramic electronic device, preferably, an average particle size of the first segregations is 0.05 μm or more and 0.30 μm or less.

In the multilayer ceramic electronic device, preferably, the perovskite compound comprises barium titanate.

Preferably, the ceramic layer includes a second segregation containing Mg.

DETAILED DESCRIPTION OF THE INVENTION

Figure 1:
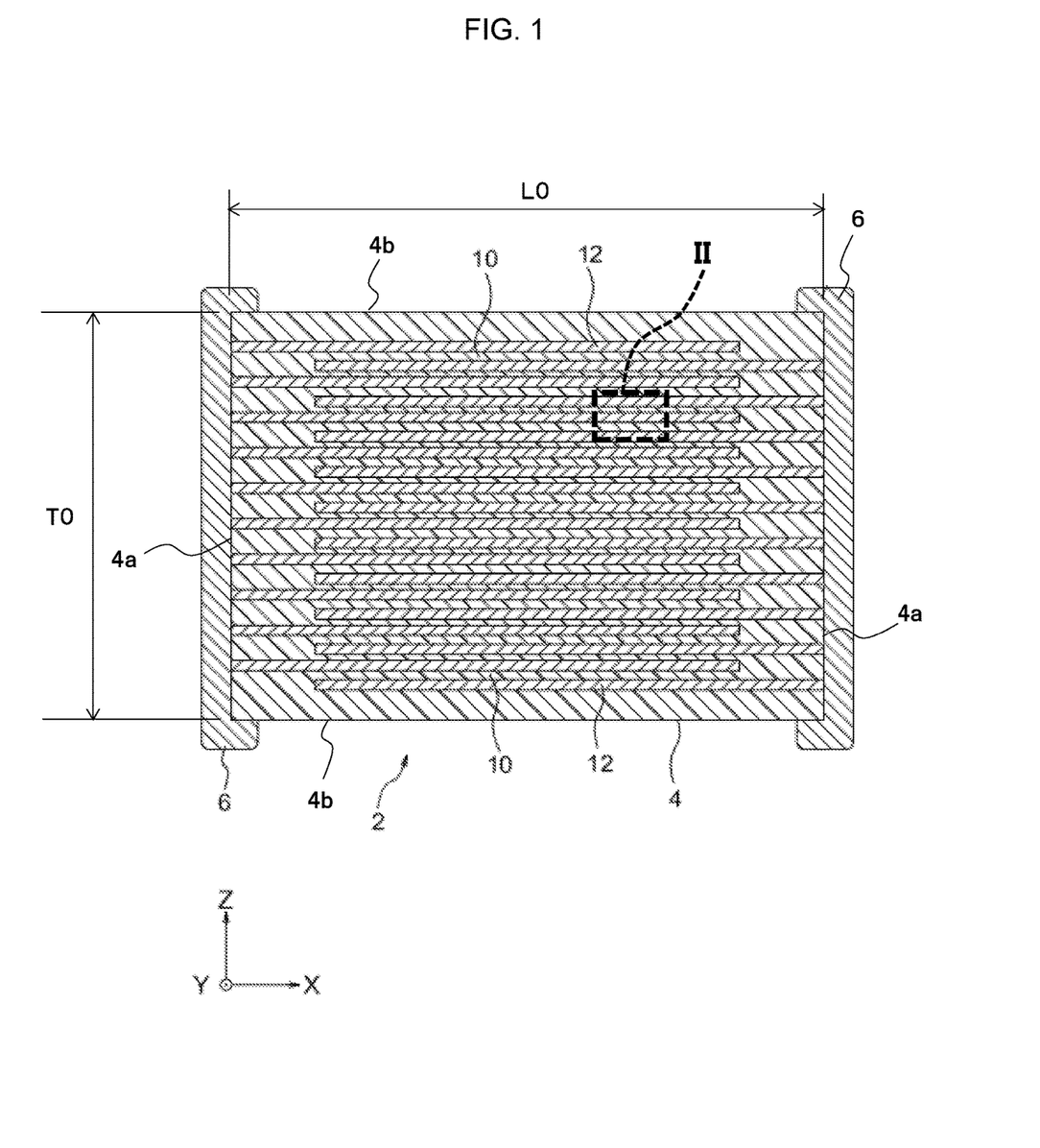
FIG. 1 is a schematic view illustrating a cross section of a multilayer ceramic capacitor according to an embodiment of the present invention.

In the present embodiment, a multilayer ceramic capacitor 2 shown in FIG. 1 is described as an example of a ceramic electronic device according to the present invention. The multilayer ceramic capacitor 2 includes an element body 4 and a pair of external electrodes 6 formed on the external surface of the element body 4.

The element body 4 shown in FIG. 1 normally has a substantially rectangular parallelepiped shape and includes two end surfaces 4a facing each other in the X-axis direction, two side surfaces 4b facing each other in the Y-axis direction, and two side surfaces 4b facing each other in the Z-axis direction, but the element body 4 may have any other shape, such as elliptical columnar shape, columnar shape, and prismatic shape. The element body 4 has any outer size and can have, for example, a length L0 of 0.4-5.7 mm in the X-axis direction, a width W0 of 0.2-5.0 mm in the Y-axis direction, and a height T0 of 0.2-3.0 mm in the Z-axis direction. In the present embodiment, the X-axis, the Y-axis, and the Z-axis are perpendicular to each other.

The element body 4 includes ceramic layers 10 and internal electrode layers 12 substantially parallel to the plane including the X-axis and the Y-axis. In the inside of the element body 4, the ceramic layers 10 and the internal electrode layers 12 are laminated alternately along the Z-axis direction. Here, "substantially parallel" means that most parts are parallel, but there may be a part that is not slightly parallel, and the ceramic layers 10 and the internal electrode layers 12 may slightly be uneven or inclined.

The average thickness (interlayer thickness) per layer of the ceramic layers 10 is not limited and can be, for example, 100 μm or less (preferably, 30 μm or less). The lamination number of ceramic layers 10 is determined based on desired characteristics and is not limited. For example, the lamination number of ceramic layers 10 can be 20 or more, preferably 50 or more.

Meanwhile, the internal electrode layers 12 are laminated between the ceramic layers 10 and the lamination number of internal electrode layers 12 is determined based on the lamination number of ceramic layers 10. The average thickness per layer of the internal electrode layers 12 is not limited and can be, for example, 3.0 μm or less. The average thickness of the ceramic layers 10 and the average thickness of the internal electrode layers 12 are calculated by observing a cross section as shown in FIG. 1 using a metallurgical microscope and measuring the thickness of each layer (10, 12) at five points or more.

The internal electrode layers 12 are laminated so that their ends on one side are alternately exposed to two end surfaces 4a of the element body 4 facing each other in the X-axis direction. Then, the pair of external electrodes 6 is formed on the end surfaces 4a of the element body 4 and electrically connected to the exposed ends of the internal electrode layers 12 alternately arranged. Since the external electrodes 6 are formed in such a manner, a capacitor circuit is formed by the external electrodes 6 and the internal electrode layers 12.

As shown in FIG. 1, each of the external electrodes 6 integrally includes an end surface part formed on the end surface 4a of the element body 4 and extension parts formed at an end in the X-axis direction on each of the side surfaces 4b of the element body 4. That is, each of the external electrodes 6 is formed so as to range from the end surface 4a to the side surfaces 4b of the element body 4. The external electrodes 6 are insulated so as not to contact with each other in the X-axis direction.

Note that, the extension parts of the external electrodes 6 are not necessarily formed, and each of the external electrodes 6 may be formed from only the end surface part. Instead, when the multilayer ceramic capacitor 2 is surface-mounted on a substrate, the extension parts of the external electrodes 6 are formed at least on the side surface 4b facing a mounting surface of the substrate and are not necessarily formed on the side surface 4b opposite to the mounting surface.

The external electrodes 6 can include a baked electrode layer, a resin electrode layer, a plating electrode layer, or the like and may be composed of a single electrode layer or a plurality of laminated electrode layers. For example, the external electrode 6 can have a triple-layer structure of a baked electrode layer—a Ni plating layer—a Sn plating layer (laminated in this order). In this case, the Sn plating layer is located on the outermost surface of the external electrode 6, and the solder wettability of the external electrode 6 is thus favorable.

Next, the details of the components and the internal texture of the ceramic layers 10 and the internal electrode layers 12 are explained.

The ceramic layers 10 are composed of a dielectric composition including a perovskite compound represented by a general formula of $ABO_3$ as a main component. Here, the main component of the ceramic layers 10 (the main component of the dielectric composition) means a component occupying 80 mol % or more of the ceramic layers 10. In the present embodiment, the perovskite compound (main component) is preferably barium titanate (BT). This barium titanate may be represented by a composition formula of $(Ba_{(1-a-b)}Sr_aCa_b)_m(Ti_{(1-c-d)}Zr_cHf_d)O_3$.

In the composition formula, each of a, b, c, d, and m is an elemental ratio, and each elemental ratio is not limited and can be determined within a known range. For example, "m" indicates an elemental ratio of the A-site to the B-site and can normally be 1.0-1.1. "a" indicates an elemental ratio of Sr in the A-site, and "b" indicates an elemental ratio of Ca in the A-site. In the present embodiment, $0 \leq a+b \leq 0.1$ is preferably satisfied. "c" indicates an elemental ratio of Zr in the B-site, and "d" indicates an elemental ratio of Hf in the B-site. In the present embodiment, $0 \leq c+d \leq 0.15$ is preferably satisfied. The elemental ratio of oxygen (O) in the above-mentioned composition formula may slightly deviate from the stoichiometric composition.

In addition to the above-mentioned main component, the ceramic layers 10 may include sub-components, such as Mn compounds, Mg compounds, Cr compounds, Ni compounds, rare earth element compounds, Si compounds, Li compounds, B compounds, V compounds, Al compounds, and Ca compounds. There is no limit to the type, combination, or addition amount of the sub-components.

Meanwhile, the internal electrode layers 12 are made of a conductive material and include at least Ni. Specifically, the conductive material of the internal electrode layers 12 is preferably pure Ni or a Ni alloy, and a content rate of Ni in the internal electrode layers 12 is more preferably 85 wt % or more. When the conductive material is a Ni alloy, one or more internal-electrode sub-components selected from Mn, Cu, Cr, etc. may be contained.

In addition to the conductive material, as an inhibitor, the internal electrode layers 12 may contain particles of a perovskite compound having the same composition as the main component of the ceramic layers 10 and may contain particles of first segregations 11b mentioned below. In addition, the internal electrode layers 12 may contain a trace amount (e.g., about 0.1 mass % or less) of non-metal elements, such as S and P, and may contain voids. As mentioned above, when the internal electrode layers 12 contain non-metal components, such as inhibitor particles, particles of the first segregations 11b, and voids, the internal electrode layers 12 may have disconnected parts where an electrode (conductive material) is not present due to the non-metal components.

The component compositions of the ceramic layers 10 and the internal electrode layers 12 are analyzed by inductively coupled plasma emission spectroscopy (ICP), laser ablation ICP mass analysis (LA-ICP-MS), fluorescent X-ray analysis (XRF), energy dispersive X-ray analysis (EDX), electron beam microanalyzer (EPMA) equipped with wavelength dispersive X-ray spectroscope (WDS), or the like.

Figure 2:
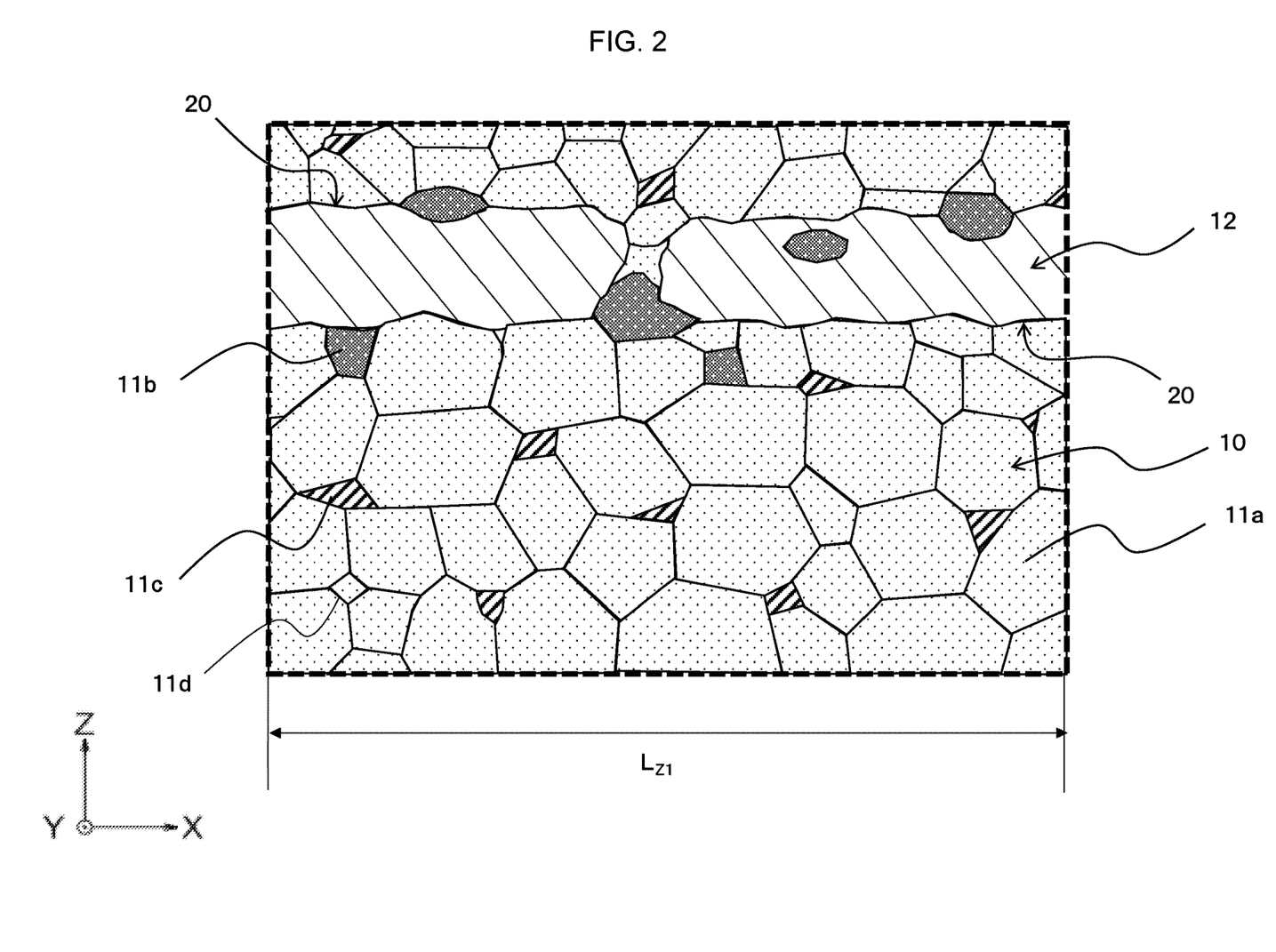
FIG. 2 is an enlarged cross-sectional view of the region II shown in FIG. 1.

The ceramic layers 10 containing the above-mentioned components have an internal texture as shown in FIG. 2 and include dielectric particles 11a (parent phases), segregation phases (11b, 11c) having predetermined characteristics, and grain boundaries 11d located between the dielectric particles 11a.

The dielectric particles 11a are composed of the main component (perovskite compound) of the ceramic layers 10 mentioned above. In addition to the main component, when the ceramic layers 10 include sub-components, the sub-components may be solid-soluted in the dielectric particles 11a. The dielectric particles 11a may have a core-shell structure. The dielectric particles 11a can have an average particle size of 0.05 μm to 2 μm and preferably have an average particle size of 0.1 μm to 1 μm. The average particle size can be measured by observing a cross section of the ceramic layers 10 as shown in FIG. 2 using a scanning electron microscope (SEM), a scanning transmission electron microscope (STEM), or the like and performing an image analysis of the obtained cross-sectional photograph. For example, an average particle size of the dielectric particles 11a is calculated by measuring equivalent circle diameters of at least 100 or more dielectric particles 11a.

As shown in FIG. 2, the element body 4 according to the present embodiment includes first segregations 11b. The first segregations 11b are phases of a composite oxide whose total concentration of Si and Ni is higher than that in the dielectric particles 11a. The first segregations 11b include at least Ba, Ti, Si, Ni, and O and may further include constituent elements of the ceramic layers 10 (elements that can be contained in the main component, such as Sr, Ca, Zr, and Hf, sub-component elements, etc.).

In particular, preferably, the first segregations 11$b$ contain Ni in a predetermined ratio. Specifically, preferably, a molar ratio (Ni/Si) of Ni to Si in the first segregations 11$b$ is 0.1 or more. The molar ratio (Ni/Si) has no upper limit and preferably has an upper limit of, for example, 0.8 or less. Assuming that the total content of elements other than oxygen contained in the first segregations 11$b$ is 100 mol, the sum of Ni content and Si content is preferably 3 mol % or more and is more preferably 5 mol % to 20 mol %. The content rate of other elements in the first segregations 11$b$ is not limited. For example, the first segregations 11$b$ can be composite oxide phases represented by a composition formula of $Ba_2(Ni_eTi_{(1-e)})Si_2O_{(8-e)}$. In this composition formula, e is an atomic ratio of Ni replaced with Ti site.

Preferably, the first segregations 11$b$ are determined by a combination of mapping analysis and point analysis with EDX or WDS. For example, in a cross section of the element body 4 as shown in FIG. 2, a mapping analysis is performed to determine regions where Si is segregated from a Si mapping image. Then, a point analysis is performed in each of the regions where Si is segregated. When Ba Ti, Si, Ni, O, etc. is detected in each of these segregations, these segregations are determined as the first segregations 11$b$. Specifically, the "regions where Si is segregated" determined by the above-mentioned mapping analysis means regions whose Si concentration is higher than that in the dielectric particles 11$a$. The measurement conditions, such as measurement visual field and resolution, in the mapping analysis are not limited and appropriately determined so that segregation analysis can be performed.

The first segregations 11$b$ can have an average particle size of 0.5 μm or less and preferably have an average particle size of 0.05 μm to 0.30 μm. The average particle size of the first segregations 11$b$ is calculated by determining at least five first segregations 11$b$ in the above-mentioned manner and thereafter measuring equivalent circle diameters of the first segregations 11$b$ with image analysis.

In the present embodiment, as shown in FIG. 2, the first segregations 11$b$ exist in boundaries 20 between the ceramic layers 10 and the internal electrode layers 12. The "first segregations 11$b$ exist in boundaries 20" means that the first segregations 11$b$ are in direct contact with both of the dielectric particles 11$a$ of the ceramic layers 10 and the internal electrode layers 12. For example, the first segregations 11$b$ may be present inside the ceramic layers 10 so as to be in contact with the internal electrode layers 12. Moreover, the first segregations 11$b$ may be present by biting into the internal electrode layers 12 rather than the ceramic layers 10. Instead of the boundaries 20, a part of the first segregations 11$b$ may be present inside the ceramic layers 10 without being in contact with the internal electrode layers 12.

The number N1 of first segregations 11$b$ contained in a unit length of the boundaries 20 can be 0.15 pieces/μm or more and is preferably 0.20 pieces/μm to 3.20 pieces/μm. The number N1 in a unit length is calculated by observing a cross section of the element body 4 in a plurality of visual fields with SEM, STEM, or the like and counting the number of first segregations 11$b$ existing at least in 100 μm or more in total of the boundaries 20. That is, the number N1 can be represented by the number $N_L$ of measured first segregations 11$b$/the total length $L_Z$ of analyzed boundaries 20.

The boundaries 20 are meandering or partially disconnected when observed at a high magnification with SEM, STEM, or the like. In the measurement of the number N1, it is not necessary to accurately measure meandering parts, disconnected parts, and the like of the boundaries 20 so as to calculate the total length $L_Z$, and the width of the cross-sectional photograph is regarded as the length of the boundaries 20. For example, as shown in FIG. 2, a cross-sectional photograph is taken so that the internal electrode layers 12 and one side of the cross-sectional photograph are substantially parallel to each other, and a width $L_{Z1}$ of the cross-sectional photograph in the X-axis direction is regarded as a length of the boundaries 20 in this observation visual field.

In addition to the first segregations 11$b$, preferably, the ceramic layers 10 according to the present embodiment include second segregations 11$c$ containing Mg. The second segregations 11$c$ are phases of a composite oxide whose Mg concentration is higher than that in the dielectric particles 11$a$. In addition to Mg, the second segregations 11$c$ may contain constituent elements of the ceramic layers 10. In particular, preferably, the second segregations 11$c$ contain O, Ba, and Ti. The detailed composition of the second segregations 11$c$ is not limited, but the second segregations 11$c$ are preferably, for example, $Ba(Ti_{(1-x)}Mg_x)O_3$ (hexagonal). In this composition formula, x represents an atomic number ratio of Mg. The numerical range of x is not limited and can be, for example, 0.02 to 0.30. The atomic number ratio of oxygen in the above-mentioned composition formula is 3.0, but may deviate slightly.

The second segregations 11$c$ can be determined by a mapping analysis with EDX or EDS. At this time, the mapping analysis is performed in the same manner as the analysis of the first segregations 11$b$. Then, regions whose Mg concentration is higher than that in the dielectric particles 11$a$ are extracted from a Mg mapping image obtained by the mapping analysis, and these regions are determined as the second segregations 11$c$.

The second segregations 11$c$ can have an average particle size of 2 μm or less and preferably have an average particle size of 0.01 μm to 1 μm. The average particle size of the second segregations 11$c$ is measured in the same manner as the average particle size of the first segregations 11$b$. That is, the average particle size of the second segregations 11$c$ is calculated by determining at least five second segregations 11$c$ in the above-mentioned manner and thereafter measuring equivalent circle diameters of the second segregations 11$c$ with image analysis.

Preferably, the second segregations 11$c$ are present inside the ceramic layers 10. "inside the ceramic layers 10" means that the second segregations 11$c$ are not in direct contact with the internal electrode layers 12, but are present so as to be surrounded by the dielectric particles 11$a$. However, a part of the second segregations 11$c$ may be present in the boundaries 20 so as to be in contact with the internal electrode layers 12. Preferably, the number N2 of second segregations 11$c$ contained in a unit cross-sectional area of the ceramic layers 10 is 0.002 pieces/μm$^2$ to 1 pieces/μm$^2$. The number N2 is calculated by performing the above-mentioned mapping analysis in a plurality of visual fields and dividing the number of determined second segregations 11$c$ by a total area of the measurement visual fields.

The grain boundaries 11$d$ existing between the dielectric particles 11$a$ are composed of constituent elements of the main component and sub-component elements. Other segregation phases (segregation phases other than the first segregations 11$b$ and the second segregations 11$c$) due to the sub-components may be present in the grain boundaries 11$d$. In addition to the dielectric particles 11$a$ and the segregation phases mentioned above, voids and secondary-phase particles may be present in the ceramic layers 10.

Next, a method of manufacturing the multilayer ceramic capacitor 2 shown in FIG. 1 is explained.

First, a manufacturing process of the element body 4 is explained. In the manufacturing process of the element body 4, a dielectric paste to be the ceramic layers 10 after firing and an internal-electrode paste to be the internal electrode layers 12 after firing are prepared.

For example, the dielectric paste is produced in the following manner. First, dielectric raw materials are uniformly mixed, for example, in wet manner and dried. Then, a heat treatment is performed with predetermined conditions to obtain a calcined powder. A known organic vehicle or a known water-based vehicle is added to the obtained calcined powder and kneaded to prepare a dielectric paste. If necessary, the dielectric paste may contain additives selected from various dispersants, plasticizers, dielectrics, sub-component compounds, glass frits, and the like.

When the second segregations 11c are formed in the ceramic layers 10, a second-segregation raw material powder is added to the above-mentioned dielectric paste. For example, the second-segregation raw material powder is obtained by mixing a $MgCO_3$ powder, a $BaCO_3$ powder, and a $TiO_2$ powder at a predetermined proportion, mixing the mixture, and appropriately pulverizing it. Then, the prepared second-segregation raw material powder is mixed with a vehicle together with the above-mentioned calcined powder of the dielectric raw materials to prepare the dielectric paste.

Meanwhile, the internal-electrode paste is prepared by kneading a conductive powder (preferably, Ni powder or Ni alloy powder) made of a conductive metal or an alloy thereof, a first-segregation raw material powder, and a known binder or solvent. The first-segregation raw material powder added at this time is obtained by mixing a $BaCO_3$ powder, a $TiO_2$ powder, a $SiO_2$ powder, and a NiO powder at a predetermined proportion, mixing the mixture, and appropriately pulverizing it. The first segregations 11b can be present in the boundaries 20 by adding the first-segregation raw material powder into the internal-electrode paste.

If necessary, the internal-electrode paste may include a ceramic powder (e.g., barium titanate powder) as an inhibitor. The inhibitor exhibits a reduction effect on the sintering of the conductive powder in the firing step.

Next, the dielectric paste is turned into sheets by, for example, a doctor blade method to obtain ceramic green sheets. Then, the internal-electrode paste is applied onto the ceramic green sheets in a predetermined pattern by various printing methods, such as screen printing, or a transfer method. Moreover, the green sheets with the internal electrode patterns are laminated and thereafter pressed in the lamination direction to obtain a mother laminated body. At this time, the ceramic green sheets and the internal electrode patterns are laminated so that the ceramic green sheets are located on the upper surface and the lower surface of the mother laminated body in the lamination direction.

The mother laminated body obtained by the above-mentioned process is cut into a predetermined size by dicing or push-cutting to obtain a plurality of green chips. If necessary, the green chips may be solidified and dried so as to remove the plasticizer and the like and may be subjected to a barrel polishing using a horizontal centrifugal barrel machine or the like after the solidification and drying. In the barrel polishing, the green chips are put into a barrel container together with a medium and a polishing liquid, and a rotational movement or vibration is applied to the barrel container. Due to this barrel polishing, unnecessary parts, such as burrs, generated during the cutting are polished, and the corners of the green chips become rounded (corner R). The green chips after the barrel polishing are washed with a cleaning solution, such as water, and dried.

Next, the green chips obtained above are subjected to a binder removal treatment and a firing treatment to obtain the element body 4.

The conditions for the binder removal treatment are not limited and are appropriately determined based on the main component composition of the ceramic layers 10 and the main component composition of the internal electrode layers 12. For example, the heating rate is preferably 5-300° C./hour, the holding temperature is preferably 180-400° C., and the temperature holding time is preferably 0.5-24 hours. The binder removal atmosphere is the air or a reducing atmosphere.

The conditions for the firing treatment are not limited and are appropriately determined based on the main component composition of the ceramic layers 10 and the main component composition of the internal electrode layers 12. For example, the holding temperature during firing is preferably 1200-1350° C. and is more preferably 1220-1300° C., and the holding time is preferably 0.5-8 hours and is more preferably 1-3 hours. The firing atmosphere is preferably a reducing atmosphere, and for example, a mixed gas of $N_2$ and $H_2$ can be humidified and used as the atmospheric gas. When the internal electrode layers 12 are made of a base metal of Ni, Ni alloy, etc., the oxygen partial pressure in the firing atmosphere is preferably $1.0 \times 10^{-14}$ to $1.0 \times 10^{-10}$ MPa.

After the firing treatment, if necessary, an annealing may be performed. The annealing is a treatment for reoxidizing the ceramic layers 10. When the firing treatment is carried out in a reducing atmosphere, the annealing is preferably performed. The conditions for the annealing treatment are not limited and are also appropriately determined based on the main component composition of the ceramic layers 10 and the like. For example, the holding temperature is preferably 950-1150° C., the temperature holding time is preferably 0-20 hours, and the heating rate and the cooling rate are preferably 50-500° C./hour. Preferably, a humidified $N_2$ gas or the like is used as the atmospheric gas, and the oxygen partial pressure in the annealing atmosphere is $1.0 \times 10^{-9}$ to $1.0 \times 10^{-5}$ MPa.

In the above-mentioned binder removal treatment, firing treatment, and annealing treatment, for example, a wetter is used to humidify the $N_2$ gas, the mixed gas, and the like. In this case, the water temperature is preferably about 5-75° C. The binder removal treatment, the firing treatment, and the annealing treatment may be performed continuously or independently.

Next, a pair of external electrodes 6 is formed on the outer surface of the element body 4 obtained above. The external electrodes 6 are formed by any method. For example, when baked electrodes are formed as the external electrodes 6, a conductive paste containing glass frits is applied to the end surfaces of the element body 4 by a dip method, and the element body 4 is thereafter heated at a predetermined temperature. When resin electrodes are formed as the external electrodes 6, a conductive paste containing a thermosetting resin is applied to the end surfaces of the element body 4, and the element body 4 is thereafter heated at a temperature at which the thermosetting resin is cured. After the baked electrodes or the resin electrodes are formed in the above-mentioned manner, sputtering, vapor deposition, electrolytic plating, electroless plating, or the like may be performed so as to form the external electrodes 6 having a multilayer structure.

After the above-mentioned process, the multilayer ceramic capacitor 2 including the external electrodes 6 is obtained.

(Summary of Embodiment)

The multilayer ceramic capacitor 2 according to the present embodiment has a structure in which the ceramic layers 10 including a perovskite compound represented by ABO$_3$ as a main component and the internal electrode layers 12 are laminated alternately. Then, the first segregations containing Ba, Ti, Si, Ni, and O are present in the boundaries 20 between the ceramic layers 10 and the internal electrode layers 12.

Since the multilayer ceramic capacitor 2 has the above-mentioned characteristics, the insulation resistance is less likely to decrease in a high-temperature and high-humidity environment, and the durability for a high-temperature and high-humidity environment is improved. The reason why the durability is improved is not necessarily clear, but it is considered that the improvement in durability is due to the improvement in joint strength between the ceramic layers 10 and the internal electrode layers 12 by the first segregations 11b containing predetermined elements.

Generally, material characteristics, such as shrinkage rate and linear expansion coefficient, are different from each other between ceramic layers composed of dielectric ceramics and internal electrode layers composed of Ni, and peeling of the internal electrode layers and cracks in the ceramic layers are likely to occur due to this difference in characteristics. In the multilayer ceramic capacitor 2 according to the present embodiment, the first segregations 11b existing in the boundaries 20 are a composite oxide containing Ba, Ti, etc. and are thereby considered to have characteristics for easy joint with the dielectric particles 11a. Moreover, the first segregations 11b contain Ni and are thereby considered to also have characteristics for easy joint with the internal electrode layers 12.

As mentioned above, the first segregations 11b have a high affinity for both of the dielectric particles 11a of the ceramic layers 10 and Ni of the internal electrode layers 12, and the existence of the first segregations 11b in the boundaries 20 is considered to improve the joint strength between the ceramic layers 10 and the internal electrode layers 12. As a result, the multilayer ceramic capacitor 2 according to the present embodiment is considered to prevent the peeling of the internal electrode layers 12 and the generation of cracks in the ceramic layers 10 and improve the durability for a high-temperature and high-humidity environment.

In particular, in the present embodiment, a Ni/Si ratio in the first segregations 11b is 0.1 or more, and this feature is considered to further improve the joint strength between the ceramic layers 10 and the internal electrode layers 12. As a result, the durability for a high-temperature and high-humidity environment can be further improved.

When the first segregations 11b have an average particle size of 0.05 µm or more and 0.30 µm or less, it is possible to more favorably prevent the peeling of the internal electrode layers 12 and the generation of cracks in the ceramic layers 10. As a result, the durability for a high-temperature and high-humidity environment can be further improved.

In the multilayer ceramic capacitors 2 according to the present embodiment, the second segregations 11c containing Mg (preferably, Ba(Ti$_{(1-x)}$Mg$_x$)O$_3$ (hexagonal)) are present inside the ceramic layers 10. The durability for a high-temperature and high-humidity environment can be further improved by the second segregations 11c. Moreover, the sintering density of the ceramic layers 10 can be improved by the second segregations 11c.

Hereinbefore, an embodiment of the present invention is explained, but the present invention is not limited to the above-mentioned embodiment and can be modified variously without departing from the gist of the present invention.

In the present embodiment, for example, the multilayer ceramic capacitor 2 is exemplified as the multilayer ceramic electronic device, but the multilayer ceramic electronic device of the present invention may be, for example, band-pass filters, multilayer three-terminal filters, piezoelectric elements, thermistors, varistors, or the like.

In the present embodiment, the ceramic layers 10 and the internal electrode layers 12 are laminated in the Z-axis direction, but the lamination direction may be the X-axis direction or the Y-axis direction. In that case, the external electrodes 6 are formed according to the exposed surfaces of the internal electrode layers 12. The internal electrode layers 12 may be drawn out to the outer surface of the element body 4 via through-hole electrodes. In this case, the through-hole electrodes and the external electrodes 6 are electrically connected to each other.

EXAMPLES

Hereinafter, the present invention is explained in more detail with examples of the present invention, but the present invention is not limited to the examples.

(Experiment 1)

Example 1

In Example 1, a multilayer ceramic capacitor 2 shown in FIG. 1 was manufactured in the following manner.

First, a dielectric paste and an internal-electrode paste were prepared. Specifically, the dielectric paste was produced by mixing a barium titanate powder (BaTiO$_3$ powder) to be a main component of ceramic layers 10, sub-component powders (MgCO$_3$ powder, Dy$_2$O$_3$ powder, MnCO$_3$ powder, and SiO$_2$ powder), and an organic vehicle. The barium titanate powder (dielectric raw material powder) was produced by a hydrothermal synthesis method.

Meanwhile, the internal-electrode paste was produced by mixing a Ni powder, a first-segregation raw material powder, a barium titanate powder (inhibitor), a binder, and a solvent. At this time, the first-segregation raw material powder added to the internal-electrode paste was a Ba—Ti—Si—Ni—O based composite oxide powder. This Ba—Ti—Si—Ni—O based composite oxide powder was obtained by mixing a BaCO$_3$ powder, a TiO$_2$ powder, a SiO$_2$ powder, and a NiO powder at a predetermined proportion, calcining the mixture, and pulverizing it.

Next, green chips were manufactured by a sheet method using the dielectric paste and the internal-electrode paste mentioned above. Then, the green chips were subjected to a binder removal treatment, a firing treatment, and an annealing treatment to obtain an element body 4 having a size of L0×W0×T0=2.0 mm×1.25 mm×1.25 mm. In the element body 4, the lamination number of ceramic layers 10 sandwiched by the internal electrode layers 12 was 600, the average thickness of the ceramic layers 10 was 0.8 and the average thickness of the internal electrode layers 12 was 0.8

Next, a baked electrode layer containing Cu, a Ni plating layer, a Sn plating layer were formed in this order on the outer surface of the element body 4 mentioned above. After the above-mentioned process, the capacitor samples according to Example 1 were obtained.

Example 2

In Example 2, a first-segregation raw material powder (Ba—Ti—Si—Ni—O based composite oxide powder) was added not only to an internal-electrode paste, but also to a dielectric paste. Except for the above, the experimental conditions according to Example 2 were the same as those in Example 1, and capacitor samples according to Example 2 were obtained.

Example 3

In Example 3, a dielectric paste was produced by mixing a barium titanate powder, a second-segregation raw material powder, sub-component powders ($MgCO_3$ powder, $Dy_2O_3$ powder, $MnCO_3$ powder, and $SiO_2$ powder), and an organic vehicle. The second-segregation raw material powder added to the dielectric paste was a composite oxide powder represented by $Ba(Ti,Mg)O_3$ and obtained by mixing a $MgCO_3$ powder, a $BaCO_3$ powder, and a $TiO_2$ powder at a predetermined proportion, calcining the mixture, and pulverizing it. In Example 3, a first-segregation raw material powder was also added to the internal-electrode paste. Except for the above, the experimental conditions according to Example 3 were the same as those in Example 1, and capacitor samples according to Example 3 were obtained.

Comparative Example 1

In Comparative Example 1, a dielectric paste and an internal-electrode paste were prepared without using segregation raw material powders. That is, the dielectric paste of Comparative Example 1 was prepared by mixing a barium titanate powder, a sub-component powder (the same sub-component as in Example 1), and an organic vehicle, and the internal-electrode paste of Comparative Example 1 was prepared by mixing a Ni powder, a barium titanate powder (inhibitor), a binder, and a solvent. Except for the above, the experimental conditions according to Comparative Example 1 were the same as those in Example 1, and capacitor samples according to Comparative Example 1 were obtained.

Comparative Example 2

In Comparative Example 2, a ceramic powder not containing Ni was added to an internal-electrode paste. Specifically, a Ba—Ti—Si—O based fresnoite powder was added to the internal-electrode paste according to Comparative Example 2, and this fresnoite powder was obtained by mixing and calcining a $BaCO_3$ powder, a $TiO_2$ powder, and a $SiO_2$ powder. Except for the above, the experimental conditions according to Comparative Example 2 were the same as those in Example 1, and capacitor samples according to Comparative Example 2 were obtained.

Comparative Example 3

In Comparative Example 3, a first-segregation raw material powder (Ba—Ti—Si—Ni—O based composite oxide powder) was added only to a dielectric paste, not to an internal-electrode paste. Except for the above, the experimental conditions according to Comparative Example 3 were the same as those in Example 1, and capacitor samples according to Comparative Example 3 were obtained.

The capacitor samples according to each Example and each Comparative Example manufactured in Experiment 1 were subjected to the following evaluations.

Analysis of Segregations

In Experiment 1, segregation phases existing in the boundaries 20 and segregation phases existing inside the ceramic layers 10 were determined by observing a cross section of each capacitor sample with STEM and performing a mapping analysis and a point analysis with EDX at that time. Table 1 shows the measurement results in each Example and each Comparative Example. "-" written in the columns of segregation phases in Table 1 means that no segregation phase was observed in this region.

Durability Evaluation

A pressure cooker bias test (PCBT) was performed so as to evaluate the durability of the capacitor samples for a high-temperature and high-humidity environment. Specifically, the capacitor samples were left for 24 hours in an environment of temperature: 121° C., humidity: 95%, and atmospheric pressure: $2.026 \times 10^5$ Pa while voltage (4V) was being applied to the capacitor samples. Then, insulation resistances of the capacitor samples were measured before and after the PCBT, and the sample in which the insulation resistance after the PCBT was reduced to 1/10 or less of the insulation resistance before the test was considered to be failed (NG). This test was performed for 80 samples in each Example and each Comparative Example so as to calculate a NG rate (number of NG samples/number of test samples (80)). 0/80 was used as a pass/fail criterion for NG rate after 24 hours from the PCBT. The evaluation results are shown in Table 1.

TABLE 1

| | | | Evaluation Results of PCBT | |
| | Segregation Phases | | Condition 1: 24 hours | Condition 2: 500 hours |
| Sample No. | Segregations in Boundaries | Segregations Inside Ceramic Layers | NG Rate (NG Number/Test Number) | NG Rate (NG Number/Test Number) |
| --- | --- | --- | --- | --- |
| Comp. Ex. 1 | — | — | 5/80 | — |
| Comp. Ex. 2 | Ba—Ti—Si—O(fresnoite) | — | 4/80 | — |
| Comp. Ex. 3 | — | Ba—Ti—Si—Ni—O | 2/80 | — |
| Ex. 1 | Ba—Ti—Si—Ni—O | — | 0/80 | 4/400 |
| Ex. 2 | Ba—Ti—Si—Ni—O | Ba—Ti—Si—Ni—O | 0/80 | 2/400 |
| Ex. 3 | Ba—Ti—Si—Ni—O | $Ba(Ti, Mg)O_3$ | 0/80 | 0/400 |

As shown in Table 1, in Comparative Examples 1-3, first segregations 11b containing Ni were not present in the boundaries 20 between the ceramic layers 10 and the internal electrode layers 12, and a sufficient durability was not obtained. Meanwhile, in Examples 1-3 (first segregations 11b were present in the boundaries 20), the NG rate in the PCBT was 0/80, and the durability for a high-temperature and high-humidity environment was further improved than in each Comparative Example. In Examples 1-3, cracks in the ceramic layers 10 and peeling of the internal electrode layers 12 were prevented more than in each Comparative Example, and the durability was thereby considered to improve.

pressure: $2.026 \times 10^5$ Pa while voltage (4V) was being applied to the capacitor samples, and insulation resistances before and after the test were measured. In Experiment 2, the 240-hour PCBT was performed for 400 capacitor samples in each of Examples 11-14 so as to calculate a NG rate. The evaluation results of Experiment 2 are shown in Table 2.

TABLE 2

| | Segregation Phases Existing in Boundaries | | Evaluation Results of PCBT | |
|---|---|---|---|---|
| Sample No. | Composition Type | Ni/Si Ratio (—) | Condition 1: 24 hours NG Rate | Condition 3: 240 hours NG Rate |
| Ex. 11 | Ba—Ti—Si—Ni—O | 0.08 | 0/80 | 1/400 |
| Ex. 12 | Ba—Ti—Si—Ni—O | 0.12 | 0/80 | 0/400 |
| Ex. 13 | Ba—Ti—Si—Ni—O | 0.56 | 0/80 | 0/400 |
| Ex. 14 | Ba—Ti—Si—Ni—O | 0.76 | 0/80 | 0/400 |

In each of Comparative Examples 1-3, the durability was evaluated under stricter conditions than the above-mentioned PCBT24h (Condition 1). Specifically, in the PCBT under Condition 2, which was stricter than Condition 1, the leaving time was 500 hours, the number of test samples in each Example was 400, and other conditions (application voltage, etc.) were the same as those in Condition 1. As shown in Table 1, in the 500-hour PCBT, the NG rate in Example 3 was 0/400, and the durability in Example 3 was particularly favorable compared to that in Examples 1 and 2. This result proves that the durability for a high-temperature and high-humidity environment was further improved by forming the second segregations 11c in the ceramic layers 10 together with the first segregations 11b in the boundaries 20.
(Experiment 2)

In Experiment 2, capacitor samples according to Examples 11-14 were obtained by changing the Ni/Si ratio in the first segregations 11b existing in the boundaries 20. Specifically, the Ni/Si ratio in the first segregations 11b was controlled by changing the addition amount of the NiO powder with respect to the addition amount of the $SiO_2$ powder provided that the total addition amount of the $SiO_2$ powder and the NiO powder was fixed in the preparation for the first-segregation raw material powder. Except for the above, the experimental conditions in Experiment 2 were the same as those in Example 1 of Experiment 1, and the same evaluation as in Experiment 1 was performed.

In the durability evaluation of Experiment 2, a 24-hour PCBT (Condition 1) was performed in the same manner as Experiment 1, and a 240-hour PCBT (Condition 3) was also performed. Specifically, in the 240-hour PCBT, the capacitor samples were left for 240 hours in an environment of temperature: 121° C., humidity: 95%, and atmospheric As shown in Table 2, in any of Examples 11-14, Ba—Ti—Si—Ni—O based first segregations 11b were present in the boundaries 20, and the NG rate in the 24-hour PCBT was 0/80. Meanwhile, in the 240-hour PCBT, the NG rate in Examples 12-14 was 0/400, which was particularly favorable. This result indicates that the Ni/Si ratio in the first segregations 11b was preferably 0.1 or more.
Experiment 3

In Experiment 3, capacitor samples according to Examples 21-24 were prepared by changing the average particle size of first segregations 11b. The average particle size of the first segregations 11b was controlled by pulverization conditions in the preparation for the first-segregation raw material powder. Except for the above, the experimental conditions in Experiment 3 were the same as those in Example 1 of Experiment 1, and the same evaluations as in Experiment 2 (segregation analysis, 24-hour PCBT, and 240-hour PCBT) were also performed in Experiment 3. The evaluation results of Experiment 3 are shown in Table 3.

TABLE 3

| | Segregation Phases Existing in Boundaries | | Evaluation Results of PCBT | |
|---|---|---|---|---|
| Sample No. | Composition Type | Average Particle Size (μm) | Condition 1: 24 hours NG Rate | Condition 3: 240 hours NG Rate |
| Ex. 21 | Ba—Ti—Si—Ni—O | 0.02 | 0/80 | 4/400 |
| Ex. 22 | Ba—Ti—Si—Ni—O | 0.06 | 0/80 | 0/400 |
| Ex. 23 | Ba—Ti—Si—Ni—O | 0.28 | 0/80 | 0/400 |
| Ex. 24 | Ba—Ti—Si—Ni—O | 0.42 | 0/80 | 1/400 |

The results shown in Table 3 indicate that it was preferable for the first segregations 11b to have an average particle size of 0.05 μm or more and 0.30 μm or less.
(Experiment 4)

In Experiment 4, capacitor samples according to Examples 31-33 were prepared by changing the number N1 of first segregations 11b existing in a unit length of the boundaries 20. The number N1 was controlled by the addition amount of the first-segregation raw material powder added into the internal-electrode paste and measured by a cross-sectional analysis with STEM. Except for the above, the experimental conditions in Experiment 4 were the same as those in Example 1 of Experiment 1, and the same evaluations as in Experiment 2 were performed in Experiment 4. The evaluation results of Experiment 4 are shown in Table 4.

TABLE 4

| | | Number N1 of First | Evaluation Results of PCBT | |
| | | | Condition 1: 24 hours | Condition 3: 240 hours |
| Sample No. | Composition Type | Segregations (pieces/μm) | NG Rate | NG Rate |
| --- | --- | --- | --- | --- |
| Ex. 31 | Ba—Ti—Si—Ni—O | 0.18 | 0/80 | 2/400 |
| Ex. 32 | Ba—Ti—Si—Ni—O | 0.27 | 0/80 | 0/400 |
| Ex. 33 | Ba—Ti—Si—Ni—O | 3.20 | 0/80 | 0/400 |

Segregation Phases Existing in Boundaries

The results shown in Table 4 indicate that the number N1 of first segregations 11b existing in a unit length of the boundaries 20 was preferably 0.2 pieces/μm or more and 3.2 pieces/μm or less.

DESCRIPTION OF THE REFERENCE NUMERICAL

2 . . . multilayer ceramic capacitor
4 . . . element body
4a . . . end surface
4b . . . side surface
10 . . . ceramic layer
12 . . . internal electrode layer
20 . . . grain boundary
11a . . . dielectric particle
11b . . . first segregation
11c . . . second segregation
11d . . . grain boundary
6 . . . external electrode

What is claimed is:

1. A multilayer ceramic electronic device comprising an element body formed by alternately laminating a ceramic layer including a perovskite compound represented by $ABO_3$ as a main component and an internal electrode layer containing Ni,
    wherein first segregations each including Ba, Ti, Si, Ni, and O are present in a boundary between the ceramic layer and the internal electrode layer, and
    a number of first segregations contained in a unit length of the boundary is 0.2 pieces/μm or more and 3.2 pieces/μm or less.

2. The multilayer ceramic electronic device according to claim 1, wherein a molar ratio (Ni/Si) of Ni to Si in the first segregations is 0.1 or more.

3. The multilayer ceramic electronic device according to claim 1, wherein an average particle size of the first segregations is 0.05 μm or more and 0.30 μm or less.

4. The multilayer ceramic electronic device according to claim 1, wherein the ceramic layer includes a second segregation containing Mg.

5. The multilayer ceramic electronic device according to claim 1, wherein the perovskite compound comprises barium titanate.

* * * * *